May 1, 1962     D. E. CUNNINGHAM     3,032,029
SYSTEM CONTROLLING APPARATUS AND METHOD
Filed July 9, 1958
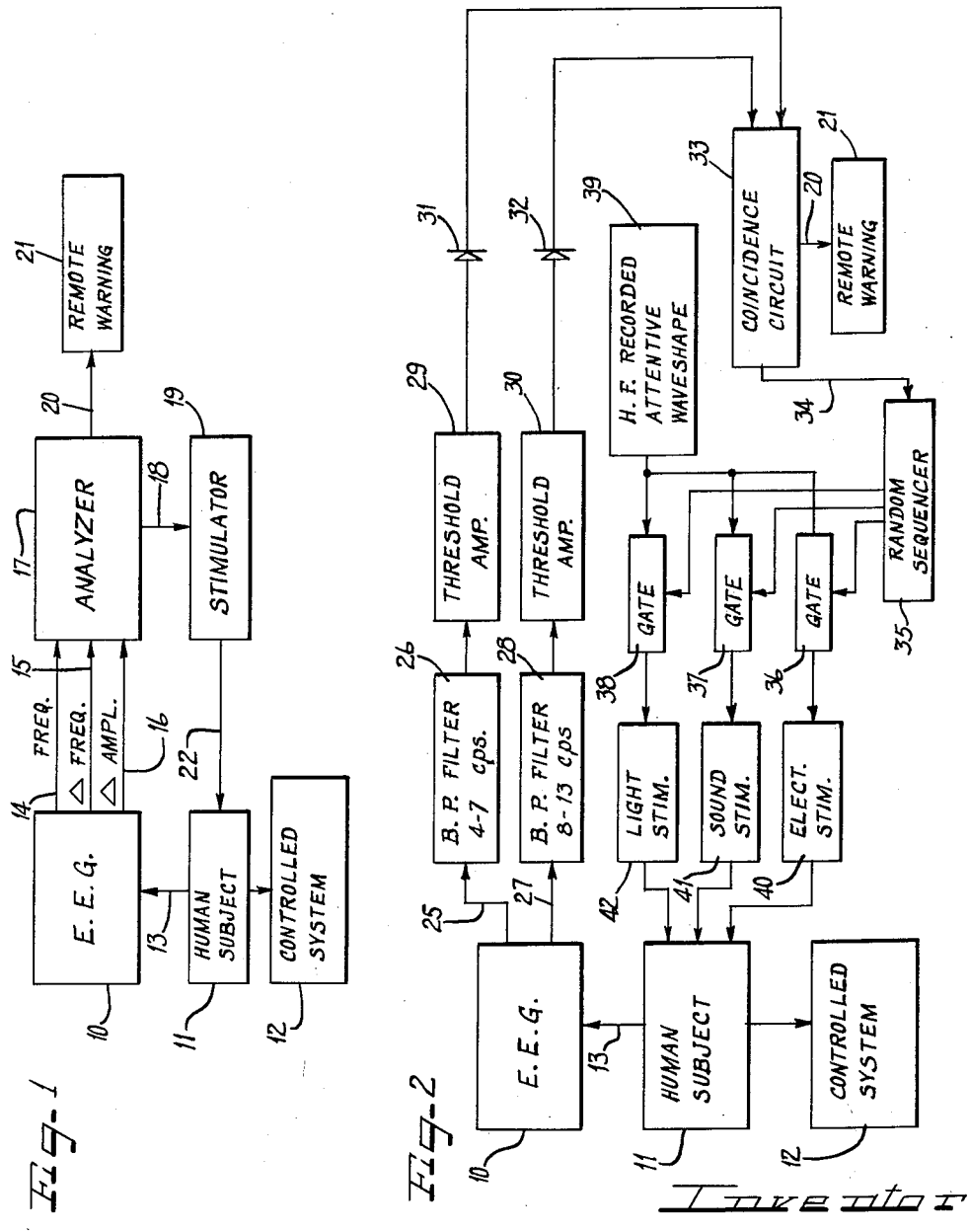
Inventor
Donald E. Cunningham

United States Patent Office 3,032,029
Patented May 1, 1962

3,032,029
SYSTEM CONTROLLING APPARATUS
AND METHOD
Donald E. Cunningham, Cleveland, Ohio, assignor to Thompson Ramo Wooldridge Inc., a corporation of Ohio
Filed July 9, 1958, Ser. No. 747,464
12 Claims. (Cl. 128—1)

This invention relates broadly to an apparatus and method to substantially reduce the incidence of human malfunction, and hence system malfunction, in the operation of a system only partly controlled or directed by at least one human operator who acts as a direct functional element of such a system and particularly where such a system is of a complex type as hereinafter disclosed. Such systems require only occasional actions and exercises of human judgment on the part of the operator and thus depend on the operator's alertness and attentiveness for their effectiveness.

This invention also relates to an apparatus and method for controlling a system including a human operator by immediately correcting operator conditions conducive to system failure, non-function or malfunction, preferably by continuously sensing or monitoring the psychological state of such a system operator and additionally by immediately and suitably stimulating certain of the senses of such an operator by, or in accordance with, the detected and measured degree of his monitored state to thus unobtrusively cause him to correct an inattentive or non-alert attitude or condition, such as the straying of his attention or drowsiness.

More particularly, this invention also relates to suitable apparatus for such purposes and, in my preferred embodiment, to apparatus including certain electroencephalographic equipment or any other equipment which may become available for the purposes of detecting and evaluating or measuring such conditions of a human control element in a manned system, and to control or to determine the stimulus of such an operator by a feed back of his own conditions, particularly his brain or emotional conditions. The apparatus of this invention thus preferably includes a feed back loop or the like by which electroencephalographic or other such suitable data from the system operator are fed back or resupplied to the same operator as a stimulus or orienting means to maintain him in an attentive attitude.

In practically all of today's complex military weapon systems and commercial production system configurations as well as most of the projected systems for the future, the human element is an important consideration. For example, the manned aircraft, submarine, ship, space station and manned space vehicle all involve one or more human beings as functional parts of the system. Likewise, our continental defense complex involves a multiplicity of human beings as direct functional elements. Malfunction of this human element will in some cases render the system completely ineffective, while in other cases, it will introduce some degree of compromise to the system.

Among the more common malfunctions of the human element in a system complex are (1) partial or complete "self-hypnosis" and (2) straying of attention while in control of the system. Any such malfunction or either of these two cases will result in some degree of compromise to the system.

It is known that the electroencephalograph (hereinafter referred to as E.E.G.) presents a unique method for the study of brain activity. Considerable work of a clinical nature has been done using the E.E.G. These studies have made possible a better understanding of brain processes of both normal and abnormal brains. The changing frequencies and amplitudes of brain wave patterns have been studied and, to some degree, correlated with age, sex, and health.

It is an object of the present invention to provide apparatus including an electroencephalograph which will monitor the psychological state of a systems operator and which will stimulate the operator should his attention stray.

It is a further object of the present invention to provide such apparatus in which a feed-back loop is established in the sense that the restimulation is controlled by a frequency derived from the normal attentive state of the subject which is applied to the subject via light, sound, electrical or similar stimuli when straying of attention is detected.

It is a further object of this invention to provide a feed-back system including an electroencephalograph which will not only restimulate the subject being monitored should his attention stray, but which may also provide a remote warning to other control centers.

While the novel and distinctive features of the invention are particularly pointed out in the appended claims, a more expository treatment of the invention, in principle and in detail, together with additional objects and advantages thereof, is afforded by the following description and accompanying drawing in which like reference characters are used to refer to like parts throughout and wherein;

FIGURE 1 is a block diagram of the system of the present invention.

FIGURE 2 is a more detailed block diagram of a presently preferred exemplary embodiment of the system of FIGURE 1.

There are several features emerging from the above noted work with the electroencephalograph that are of considerable interest. One of the most interesting and earliest was the recognition and identification of distinct recurring electrical frequencies in the brain wave pattern. These frequencies have been found almost universally in mammals from the water beetle to man. The most prominent and easily identified frequencies are the alpha (8–13 c.p.s.), beta (14–25 c.p.s.), delta (0.5–3.5 c.p.s.), and theta (4–7 c.p.s.), frequencies. To each of these can be related a particular significance; for example, a correspondence to sleep, wakefulness, drowsiness, degeneration, etc. It should be noted that the ranges of frequencies given above are indeed ranges and that overlapping is possible. In fact, both the frequency and the amplitude of a given frequency component of the brain wave pattern change as the subject performs various acts. In the case of the alpha rhythms, for example, the amplitude and repetition frequency are usually more regular when the subject has his eyes closed and is not thinking visually. When the eyes are open, the alpha frequency is greatly damped. To a certain extent, however, these above noted characteristics are peculiar to each individual.

It is the purpose of the present invention to provide apparatus which is adapted either to an individual or to as large a group of individuals as possible which will detect inattentiveness in these individuals on the basis of their known brain wave patterns. In most individuals, the appearance of the theta or "drowsiness frequency" (4–7 c.p.s.) is a detectible feature which is one indication of inattentiveness. Another indication is an increase in amplitude of the alpha frequency (8–13 c.p.s.) which, as noted above, is correlated with the absence of visual thinking. In one presently preferred embodiment of the invention, the simultaneous occurrence of these two conditions is taken as an indication of inattentiveness. It will of course be understood, however, that the apparatus of the present invention may be adapted to any particular individual upon the basis of that individual's own characteristics. Thus, the characteristics of an individual which may be considered as symptoms of inattentiveness include (1) a shift of frequency components in the brain print of any of the above noted frequency ranges as a function of the individual's type of activity, (2) changes in amplitude of any of the above noted components of the brain wave pattern, (3) the characteristics of the high frequency portion of the brain wave spectrum, that is, frequencies above 400 c.p.s., including harmonic analysis, (4) transient pulse analysis of the brain wave pattern, (5) time delay matching or correlation of activity in various brain areas. It will, of course, be understood that the choice of which of the above noted characteristics will lead to the most sensitive system in any given application must be determined for the particular individual or group of individuals for which the apparatus will be used.

One typical system configuration in accordance with the present invention is shown in FIGURE 1, wherein an electroencephalographic machine 10 is shown deriving a brain wave input from a human subject 11 who may, in turn, be the operator controlling any of the above noted military or commercial systems 12. In accordance with the above discussion it will of course be realized that the brain wave pattern from the human subject 11 supplied via electrode and cable connections 13 to E.E.G. 10 will vary in its electrical characteristics in accordance with the physical and psychological activities of the subject. E.E.G. machine 10 may be of any suitable type such as is presently used in clinical work. The manner in which electrodes are applied to the human skull and the overall manner of operation of the electroencephalographic machine are well known to those skilled in the art and will not be further discussed here. It should however, be noted that the usual caution should be taken in affixing electrodes to the subject and that the usual electrical shielding of the area in which the E.E.G. is located should also be provided.

A wave analyzer, as known in the art, may suitably form a part of the E.E.G. and provide an output signal of preselected frequency over line 14, a second output signal showing changes in frequency over line 15, and a third output signal showing changes in amplitude over line 16. These outputs over lines 14, 15 and 16 may be derived from the wave analyzer or any other suitable circuitry and are applied to an analyzer 17, one particular embodiment of which will be described in greater detail below, the function of which is to recognize or detect the characteristics of the signals on lines 14, 15 and 16 which, in accordance with the discussion above, are indicative of a lack of attentiveness on the part of the human subject or operator 11. In use of the apparatus with certain human subjects, and for some purposes, it may be sufficient for analyzer 17 to be simply a frequency responsive circuit which provides an output signal over line 18 in response to the appearance of the drowsiness frequency (4–7 c.p.s.) on line 14. Of course, it will be understood that a more accurate indication of more universal applicability can be obtained by providing for analyzer 17 more complex circuitry which indicates correlations and relationships between the signals on lines 14, 15 and 16 in accordance with the discussion above.

When analyzer 17 detects the presence of inattentiveness on the part of subject 11, it provides not only an output signal over line 18 to a stimulator 19, but may, if desired, also provide a second output signal over line 20 to any desired remote warning device 21. For example, if the system is used in a civil defense network or in a factory installation where a number of operators are being monitored, the remote warning device 21 may be located at a central control or headquarters station where personnel in charge of the over-all operation may take appropriate action on the basis of the warning provided. Similarly, if the system forms a part of airborne equipment, the remote warning device 21 could be located at ground base headquarters and its warning utilized to initiate appropriate action by radio command or otherwise.

Such remote warning is often desirable, but it will, of course, be understood that the action which can be taken by remote supervision is necessarily slower than is often desirable. It is therefore, contemplated by the present invention that the output of analyzer 17 which appears on line 18 should activate a device 19 which applies a stimulating or re-awakening or re-attentivizing signal to the human subject 11 as indicated by line 22.

This stimulation may, for example, be either photic, audio, electrical, or any combination of such types. Audio stimulation, as by a bell, horn or other similar device, has the advantage of simplicity, but photic stimulation is in some respects more suited to the concept of the present invention. Photic stimulation, has in the past, been a very useful laboratory tool, but the usual procedure has been to impress an externally controlled frequency of flashing lights or other photic stimulation on the subject's brain via optical stimulation. By the present invention, it is contemplated to impress, not a rigid externally controlled frequency on the natural frequencies of the brain wave pattern, but rather a frequency which has been derived from the subject's own brain wave pattern existing in the attentive state and recorded on magnetic tape or any other suitable medium so that when the analyzer 17 initiates operation or stimulator 19 in response to lack of attentiveness, the stimulator may provide to the subject a photic input stimulation of a frequency corresponding to that of the subject's natural brain-wave frequency in the attentive state. Of course, such a frequency may also be imposed upon intermittently sounding bells or horns or upon low voltage electrical stimulation of a pulsating unidirectional type, as well as upon flashing lights. If electrical stimulation is used a suitable source would be a 22½ volt battery intermittently switched on and off at a frequency corresponding to the natural frequencies of the subject's attentive brain-wave pattern. Whatever, the nature of the particular stimulating signal may be, it should be synchronous in frequency with the brain's natural frequency so that the brain does not have to adjust to an artificial external stimulus. These stimulating frequencies can be either simple replicas of the brain's own frequency pattern in the attentive state in its entirety or they may preferably have some harmonic relation to this pattern. In particular, frequencies of 50 cycles per second or greater in the attentive brain wave pattern may be filtered out and they and their harmonics used to control the rate of stimulation. Of course, it will be realized that precautions should be taken to adjust the system to the individual operator so as to preclude the possibility of any undesirable medical side effects.

In FIGURE 2, there is shown a more detailed block diagram of one presently preferred embodiment of the system shown in FIGURE 1. In FIGURE 2, the brain wave pattern from a human subject 11 controlling a system 12 is supplied over line 13 to electroencephalograph 10. The output from E.E.G. 10 is applied over line 25 to a band pass filter 26 having characteristics such that it will pass frequencies lying in the range of 4 through 7 cycles per second inclusive. As noted above, these are the so called theta frequencies which are characteristically associated with drowsiness. The output from E.E.G. 10 is similarly applied over a line 27 to a band pass filter 28 having electrical characteristics such that it will pass frequencies in the range of 8 through 13 cycles per second. As noted above, these are the so called alpha frequencies which are normally not present when the subject's eyes are open and an increase in the amplitude of which is normally associated with the absence of visual thinking. The system of FIGURE 2, as will become apparent from the discussion below, is such that the simultaneous presence of the alpha frequencies indicating a lack of visual thinking and of the theta frequencies indicating a state of drowsiness will trigger the re-stimulation circuitry into operation and provide a remote warning signal.

To this end the output of band pass filter 26 is applied to a threshold amplifier 29 and the output of band pass filter 28 is applied to a threshold amplifier 30. Each of the amplifiers 29 and 30 may be of a type well known in the art which is such that it will provide an output only when the amplitude of its input signal is above a predetermined threshold level. This level is preferably previously adjustable at desired values or for each operator to control the sensitivity of the apparatus to thereby establish and store data or minimum required levels for each such attentiveness indicating condition.

The output of threshold amplifier 29 is applied through a rectifier 31 to a coincidence circuit 33 and the output of threshold amplifier 30 is similarly applied through rectifier 32 as the second input to coincidence circuit 33. Coincidence circuit 33 may be any one of a number of well known types of such circuit, its characteristic being that it will provide an output signal when and only when input signals are simultaneously applied to all of its plurality of inputs which, in this case, are two. Rectifiers 31 and 32 are provided for convenience to convert the alternating current output of the threshold amplifiers to a direct or unidirectional signal which is more commonly used to energize coincidence circuits.

As in FIGURE 1, a remote warning 21 may, if desired, be provided and is actuated over line 20 by one output of the coincidence circuit 33. The output of coincidence circuit 33 is also applied over a line 34 to energize a random sequencer which is so labelled in FIGURE 2 and controls the enabling or disabling of a plurality of gates 36, 37 and 38. Each of the gates 36, 37 and 38 has applied thereto as an input a previously recorded high frequency attentive wave shape from a magnetic recorder 39 or any other suitable storage medium.

The random sequencer 35 is provided for the following reasons. It has been found that if photic stimulation alone is used, it may be quite effective initially. In time, however, many subjects tend to build up an immunity to such stimulation so that the system is no longer operating at maximum efficiency. One could, of course, simply use photic, audio, and electrical stimulation simultaneously in an attempt to overcome the tendency of subjects to become immune to stimulation. It has, however, been found that the subject's normal learning process which results in the immunity can, to a large extent, be more effectively met and hence prevent the build-up of immunity by applying alternatively and in random sequence stimulations of various types each in the above noted pre-recorded natural high frequency attentive form. Random sequencer 35 may, for example, comprise a magnetic tape or other storage medium upon which a random number table including as many digits as there are different types of stimulants has been recorded. Thus, the numbers 1, 2, 3 may be repeatedly listed in this table in an entirely random sequence. This table is then read and the number 1 may for example enable or open gate 36 only, leaving the other gates closed and thus initiate the application of an electrical stimulus to the subject by permitting signals from recorder 39 to initiate and control the operation of electrical stimulator 40. Similarly, whenever the number 2 occurs in the random sequencer, gate 37 is enabled while the other gates remain closed thereby permitting recorder 39 to initiate and control the operation of sound stimulator 41. In like fashion, whenever the number 3 occurs in the random sequencer, gate 38 may be enabled thereby permitting the recorder 39 to initiate and control the operation of light stimulator 42. It will, of course, be understood that in the system of FIGURE 2 as shown, recorder 39 would be in continuous operation while the system was in use. Alternatively, of course, this recorder could also be turned on and off by a signal from coincidence circuit 33.

The photic or light stimulator 42 may comprise any suitable light source which is flashed on and off in the field of vision of the subject 11 at a recurrence rate determined by the attentive wave form frequencies derived from recorder 39. As noted above, these frequencies themselves are in turn derived from encephalographic readings of the subject's normal wave form during attentive states. Similarly, the sound stimulator 41 may comprise any suitable bell, horn or other audio device which is likewise recurrently energized at a recurrence rate the frequency of which is determined by the signal derived from recorder 39. In like fashion, the electrical stimulator 40 may be any convenient source of voltage, preferably a harmless relatively low unidirectional voltage, which may be directly applied to the body of subject 11 and which may be switched on and off to provide a pulsating unidirectional voltage having a frequency equal to the natural frequencies determined by analysis of the subject's fully attentive wave form patterns.

It will be apparent that I have provided a system and method wherein the analysis of an electrical or an electrically determinable condition of a human operator's body indicating a standard or his own previous normal attentive condition (and specifically his brain wave frequency spectrum) is recorded and used to control a restimulation source when electroencephalographic or other data for this purpose indicates that the subject is becoming inattentive to his necessary duties with respect to a controlled system. There is thus provided a type of feedback loop which takes advantage of determinable electrical conditions of the human body indicating attentiveness or of the natural brain wave frequencies of the operator to achieve maximum efficiency of restimulation. The development of immunity to this stimulation by virtue of the learning processes may further be prevented by the use of randomly recurring stimuli of different types.

While the principles of the invention have now been made clear, there will be immediately obvious to those skilled in the art many modifications in structure, arrangement, proportions, the elements and components used in the practice of the invention and otherwise, which are particularly adapted for specific environments and operating requirements without departing from those principles. The appended claims are therefore intended to cover and embrace any such modifications within the limits only of the true spirit of the invention.

I claim as my invention:

1. Apparatus for stimulating a human subject to an attentive psychological state comprising; means to sequentially apply a plurality of different types of stimuli to said human subject intermittently at a certain recurrence rate, means to determine said certain recurrence rate by a brain wave pattern derived from said subject in the normal attentive state, and random selection means to automatically control the order in which said different stimuli are sequentially applied in accordance with a random distribution.

2. Apparatus for stimulating a human subject to an attentive psychological state comprising; a photic stimulating means, an audio stimulating means, and an electrical stimulating means, means to actuate said stimulating means sequentially in a random order, and means to intermittently operate each of said stimulating means when actuated at a recurrence rate determined by a brain wave pattern derived from said subject in the normal attentive state.

3. Apparatus comprising an electroencephalograph connected to derive at least one signal from the electrical wave forms generated by the brain of a human subject, means to apply said signal to first and second band pass filters, each of said filters having electrical transmission characteristics such that a predetermined range of frequencies is passed by said filter, first and second threshold amplifiers, means to apply the output of each of said filters to one of said amplifiers, means to apply the output of each of said threshold amplifiers to a coincidence circuit, said coincidence circuit having an output signal only when input signals are simultaneously applied thereto from each of said threshold amplifiers, means to stimulate said human subject to an attentive psychological state, and means connecting the output of said coincidence circuit to control the operation of said stimulating means.

4. Apparatus comprising an electroencephalograph connected to derive at least one output signal from the electrical wave form generated by the brain of a human subject, means responsive to a characteristic of said signal to detect a psychological state of inattentiveness of said human subject and to provide a second signal indicative thereof, first, second and third gate circuits, means to sequentially enable each of said gate circuits in a random sequence in response to the presence of said second signal, means to apply to each of said gate circuits an electrical wave form derived from the brain wave pattern of said subject in the normal attentive state, photic stimulating means controlled by the output of said first gate circuit, audio stimulating means controlled by the output of said second gate circuit, and electrical stimulating means controlled by the output of said third gate circuit, each of said stimulating means being connected to apply its output to said human subject in response to an inattentive state to stimulate said subject to an attentive state.

5. For use in a complex system including at least one human operator as a direct functional element thereof to control certain portions of the system's operation when needed according to human judgment and attentiveness to system problems: means to detect a plurality of different electrical conditions of said operator's body, each condition indicating, in certain relationships thereof, inattentiveness of said human operator to system problems, means to correlate said plurality of different conditions to determine at least one of said certain relationships indicating operator inattentiveness, and at least one stimulator controlled by said correlating means for at least one of the human senses of said operator to stimulate said operator when needed to thereby substantially reduce the element of human malfunction in the operation of said system.

6. Operator attentiveness maintaining apparatus for use in a human operator controlled system comprising: means to sense a plurality of different operator brain waves indicating operator inattentiveness in certain relationships thereof, analyzer means to correlate said plurality of different waves to determine at least one inattentiveness indicating relationship thereof, and means controlled thereby to stimulate said operator to an attentive condition only when needed to thereby increase system effectiveness.

7. In the controlling of a complex system having at least one human operator, the steps of: detecting during system operation a plurality of different electrical conditions of said operator's body, each condition indicating, in certain relationships thereof, inattentiveness of said human operator to system problems, correlating said plurality of different conditions to determine at least one of said certain relationships indicating operator inattentiveness, and periodically and only when needed stimulating at least one of the human senses of said operator when his inattentiveness is thus determined by said correlation to restore the attentiveness of said operator to thereby substantially reduce the element of human malfunction in the operation of said system.

8. In a controlling of a complex and partly human operator controlled system requiring continuous attentiveness on the part of said operator and, at least periodically, human action and judgment: the steps of continuously during system operation sensing a plurality of different operator brain waves indicating operator inattentiveness in certain relationships thereof, analyzing said plurality of different waves to correlate them and thus determine at least one inattentiveness indicating relationship thereof, and automatically stimulating said operator to an attentive condition in response to said analyzing and only when needed to thereby increase the effectiveness of system operation.

9. Apparatus providing an article of manufacture for use as a dependability increasing portion of a complex system having at least one human operator as an important and functional element thereof to exercise human judgment as limited by his attentiveness to system problems, said apparatus comprising: means to record and store at least one electrical frequency pattern corresponding to pulsating electrical conditions of the operator's body during the state of attentiveness, sensing means to detect during system operation at least one other, different, electrical frequency pattern corresponding to pulsating electrical conditions of the operator's body and indicating operator inattentiveness, and means controlled by said sensing means to periodically stimulate at least one of the senses of the operator at a frequency derived from said stored attentiveness pattern from said same operator.

10. Apparatus providing an article of manufacture for use as a dependability increasing portion of a complex military system having at least one human operator as an important and direct functional element thereof to act and exercise human judgment when needed in accordance with his attentiveness, said apparatus comprising; means to record and store at least one higher frequency and attentiveness indicating brain wave from the operator during a state of attentiveness, detecting means operative during system operation to sense at least one other, different, and lower frequency brain wave indicating operator inattentiveness, and means controlled by said detecting means to periodically stimulate a plurality of different human senses of said operator at a frequency which is in harmonic relationship with said attentiveness frequency previously determined from said same human operator.

11. Attentiveness maintaining apparatus for a human operator of a system, said apparatus comprising: electrical detecting and storing means to record at least one attentiveness indicating brain wave from said human operator during a state of attentiveness, means to detect during system operations a plurality of different operator brain waves indicating inattentiveness on the part of same operator in certain relationships thereof, means to correlate said plurality of different inattentiveness brain waves to determine at least one inattentiveness indicating relationship thereof, and means controlled by said correlating means to periodically stimulate a plurality of the different senses of said operator at a frequency derived from said stored attentiveness frequency of said human operator to thereby reduce the element of human malfunction in the operation of said system.

12. The method of maintaining the attentiveness of the human operator of a system comprising the steps of: first detecting and storing at least one attentiveness indicating brain wave from said human operator during a state of attentiveness, then detecting during system operation a plurality of different brain waves from said same operator indicating inattentiveness in certain relationships thereof, correlating said plurality of different inattentiveness brain waves to determine at least one inattentiveness indicating relationship thereof, and peridically and under the control of said correlation, stimulating a plurality of the different human senses of said operator at a frequency derived from said previously stored attentiveness frequency from said same human operator.

References Cited in the file of this patent
UNITED STATES PATENTS

| | | |
|---|---|---|
| 2,414,747 | Kirschbaum | Jan. 21, 1947 |
| 2,568,934 | Schenker | Sept. 25, 1951 |
| 2,690,178 | Bickford | Sept. 28, 1954 |
| 2,848,992 | Pigeon | Aug. 26, 1958 |
| 2,860,627 | Harden et al. | Nov. 18, 1958 |
| 2,902,030 | Kennedy et al. | Sept. 1, 1959 |